June 22, 1937.  J. C. SHOWALTER  2,084,510
PROCESS FOR DECOLORIZING AND IMPARTING BLOOM TO LUBRICATING OILS
Filed Dec. 20, 1934
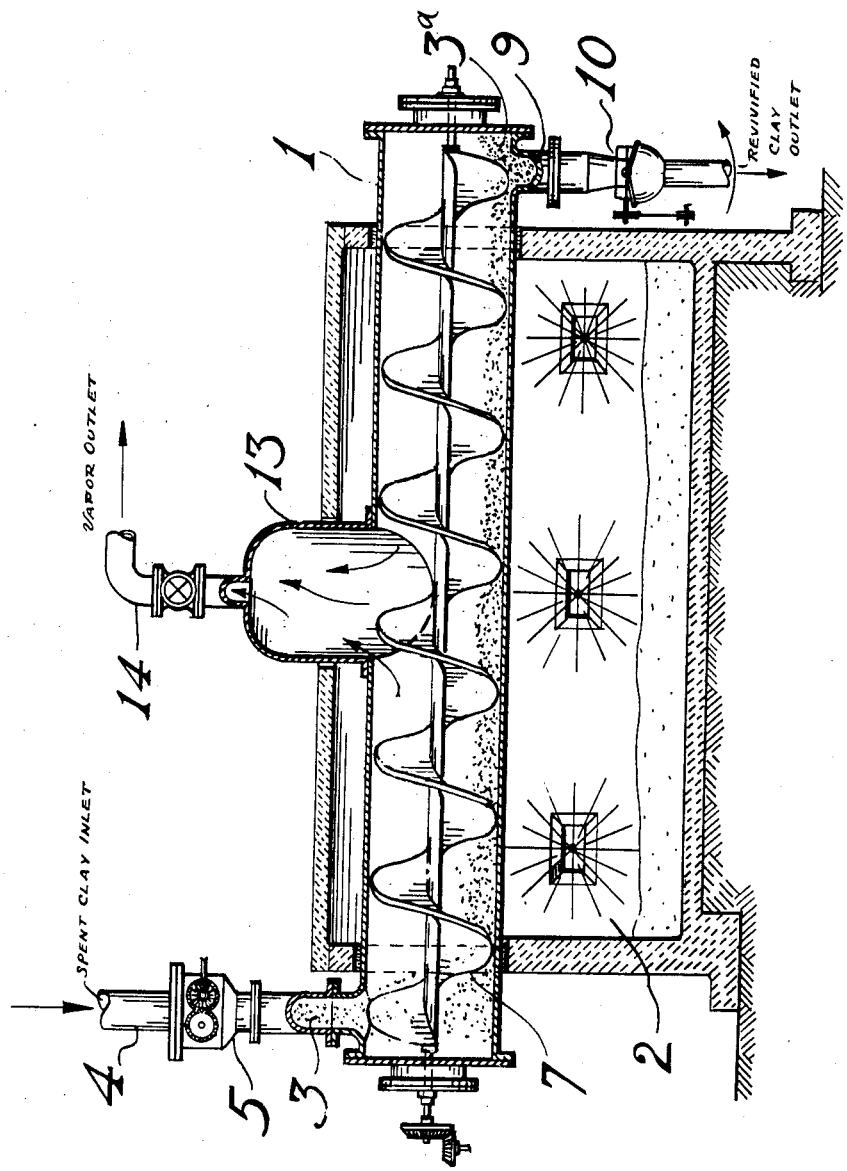
Jere C. Showalter Inventor
By P. L. Young Attorney Patented June 22, 1937

2,084,510

UNITED STATES PATENT OFFICE 2,084,510

PROCESS FOR DECOLORIZING AND IMPARTING BLOOM TO LUBRICATING OILS

Jere C. Showalter, Goose Creek, Tex., assignor to Standard Oil Development Company, a corporation of Delaware Application December 29, 1934, Serial No. 759,669

2 Claims. (Cl. 196—1)

This invention relates to a method of producing a fluorescent product for use in imparting a green fluorescence to and improving the quality of lubricating oils.

It is generally known that lubricating oils made from high grade crudes, such as Pennsylvania, possess green fluorescence when viewed by reflected light and are characterized by a red or reddish brown color when viewed by transmitted light. It is well known also that certain lubricating oils which do not possess this green fluorescence frequently acquire a blue fluorescence, and that this blue fluorescence usually indicates that the oil was produced as an overhead product by distillation from crude other than Pennsylvania. Since lubricating oils of Pennsylvania grade are usually desired in commerce, it is desirable to manufacture oils having green fluorescence.

It is an object of this invention to produce a material which when contacted with lubricating oil stock will produce an oil characterized by a green fluorescence when viewed by reflected light, and will be further characterized by a red or reddish brown color when viewed by transmitted light.

In the refining of mineral oils, it has often been customary to filter the oils through, or in some manner contact them with decolorizing earths commonly called decolorizing clays. After a clay or earth has been so used, its efficiency is impaired and it is eventually discarded as a spent clay. I have found that such a spent clay can be treated to prepare a dye which will impart a green fluorescence to an oil. The materials used are clays or earths such as infusorial earth, bentonite, fuller's earth, kieselguhr, kaolin or the like. Such a spent clay contains the absorbed coloring material plus free oil.

The process of this invention comprises charging the spent clay either batch or continuously to a retort where the spent clay is subjected to elevated temperatures adapted to crack and distill the contained oil, leaving a residual dye which remains in the clay.

A preferred apparatus for carrying out the invention is illustrated in the accompanying drawing in which latter the figure is a diagrammatic illustration in vertical section of a preferred apparatus for carrying out the invention. Referring particularly to the drawing, reference numeral 1 designates a retort disposed within a fire box 2. Spent clay 3 is fed into the retort through a line 4 and feeding device 5. The spent clay is passed through the retort by means of a worm conveyor 7 from the inlet pipe 4 to a discharge pipe 9. The discharge pipe 9 is provided with a suitable discharge device 10. In passing through the retort 1, the spent clay is subjected to elevated temperatures such as up to approximately 750° F. whereby the oil contained in the clay is subjected to distillation and cracking conditions. The distillate passes from the retort 1 through a vapor dome 13 and discharge pipe 14 to a suitable place of disposal, not shown.

The clay 3ª delivered through the discharge device 10 is revivified. It contains a very decided green material and when used to contact a petroleum oil, it imparts a decided green fluorescence to the oil when viewed by reflected light.

By way of specific example, spent Gonzales clay is obtained which has been used in contacting Coastal J pale oil, .6 lb. of the clay per gallon of the oil having been used. The spent clay was subjected to cracking and distillation conditions in a retort until 30% by weight of the oil contained in the clay was distilled overhead. During the first stage of the distillation, sulfur dioxide was given off due to the acidity of the spent clay. As the temperature was increased, the sulfur dioxide gave way to an odor of ammonia. At this stage of the distillation, a very decided green was formed in the clay. After being subjected to a temperature of approximately 750° F., the clay was allowed to cool. The clay was thereby subjected to cracking conditions to crack the free oil distilling off the lighter hydrocarbons. The residuum in the clay process comprises end products of cracking which products have the property of imparting a green fluorescence to oil.

The thus treated clay was contacted with a sample of Coastal J pale acid oil using six pounds of the clay per gallon of oil. The thus treated oil had the following characteristics:

| | 100% reclaimed clay .6 lb. per gal. |
|---|---|
| Color—Rob | 7¼+ |
| Color—N. P. A | 3¾ |
| Color drop (Rob.) 24 hours @ 220° F | 3¾ |
| Viscosity @ 210° F | 95 |
| Neut. value | .05 |
| Cast | Excellent green |

It will thus be seen that fresh lube oil when contacted with the reclaimed clay obtains a very desirable green cast and at the same time the lube oil is decolorized.

Various changes may be made within the scope of the appended claims in which it is desired to claim all novelty inherent in the invention as broadly as the prior art permits.

I claim:

1. A process for improving the Robinson color of a petroleum lubricating oil and imparting a green bloom thereto, which comprises contacting said oil with a clay which has been prepared by subjecting a spent clay which has been used for removing coloring material from oil and which contains adsorbed coloring material and free oil to cracking conditions for a length of time up to and not substantially exceeding the point at which the clay assumes a distinct green color.

2. A process according to the preceding claim in which the treatment of the spent clay is conducted at a temperature of approximately 750° F.

JERE C. SHOWALTER.